(12) United States Patent
Polanek et al.

(10) Patent No.: US 7,339,111 B2
(45) Date of Patent: *Mar. 4, 2008

(54) SYSTEM HANDLING VIDEO, CONTROL SIGNALS AND POWER

(75) Inventors: Edward L. Polanek, Richmond, IL (US); James P. Hertrich, Arlington Heights, IL (US); Peter D. Lockhart, Third Lake, IL (US); Andrew C. Jimenez, Chicago, IL (US); Lawrence J. Roberts, Hammond, IN (US)

(73) Assignee: NITEK International, LLC, Rolling Meadows, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/712,120

(22) Filed: Feb. 28, 2007

(65) Prior Publication Data

US 2007/0163796 A1    Jul. 19, 2007

Related U.S. Application Data

(63) Continuation of application No. 10/438,712, filed on May 15, 2003, now Pat. No. 7,193,149.

(60) Provisional application No. 60/381,906, filed on May 17, 2002.

(51) Int. Cl.
*H01B 7/34* (2006.01)
(52) U.S. Cl. ........................................................ 174/36
(58) Field of Classification Search .................. 174/36, 174/110 R, 113 R, 74 R, 77 R, 88 R
See application file for complete search history.

(56) References Cited

U.S. PATENT DOCUMENTS

| | | |
|---|---|---|
| 4,992,774 A | 2/1991 | McCullough |
| 5,268,676 A | 12/1993 | Asprey et al. |
| 5,353,409 A | 10/1994 | Asprey et al. |
| 5,528,286 A | 6/1996 | Goolcharan |
| 5,828,293 A | 10/1998 | Rickard |
| 5,884,086 A | 3/1999 | Amoni et al. |
| 6,111,595 A | 8/2000 | Hertrich |
| 6,115,468 A | 9/2000 | DeNicolo |

(Continued)

FOREIGN PATENT DOCUMENTS

EP    0 726 673 A    2/1996

OTHER PUBLICATIONS

Network Video Technologies, Inc., CCTV Applications booklet (1997).

(Continued)

*Primary Examiner*—William H. Mayo, III
(74) *Attorney, Agent, or Firm*—George H. Gerstman; Seyfarth Shaw LLP

(57) ABSTRACT

The system integrates a CCTV system including one or more video source units into the structured cabling system ("SCS") of a building or the like by combining video signals, control signals and power for each video source unit over a single multipair cable made up of plural unshielded twisted pairs ("UTP") of insulated copper conductors, so that one twisted pair of the cable carries the video signals, one pair carries the control signals and one or two pairs carry the power. The system includes combiners and distributors which can interface with the SCS cable through standard modular, multi-pin plug and jack connectors.

14 Claims, 4 Drawing Sheets

U.S. PATENT DOCUMENTS

| | | |
|---|---|---|
| 6,310,286 B1 | 10/2001 | Troxel et al. |
| 6,473,608 B1 | 10/2002 | Lehr et al. |
| 2002/0007432 A1 | 1/2002 | Ahern |
| 2002/0049879 A1 | 4/2002 | Eyer |
| 2002/0177357 A1 | 11/2002 | Inui |

OTHER PUBLICATIONS

Network Video Technologies, Inc., brochure on NVT transceivers (prior to May 2002).

Network Video Technologies, Inc., brochure on Compus Wide UTP/CCTV Solutions (prior to May 2000).

PI Manufacturing Corp. flyer for Perfect Security solution (prior to May 2002).

PI Manufacturing Corp. catalog for Security Solutions—Video Balun (2000).

NITEK brochure for Twisted Pair Video and Data (prior to May 2002).

SYSTEM HANDLING VIDEO, CONTROL SIGNALS AND POWER

RELATED APPLICATION

This application is a continuation of U.S. patent application Ser. No. 10/438,712 filed May 15, 2003, now U.S. Pat. No. 7,193,149. This application also claims the benefit of the filing date of U.S. provisional application Ser. No. 60/381,906, filed May 17, 2002.

BACKGROUND

This application relates to communications systems, particularly video systems. The application relates in particular to interconnection apparatus and methods for handling all of the electrical requirements for video systems, such as Closed Circuit TV ("CCTV") systems, including those of the types used in video security systems.

In the past, buildings would have several cabling systems, respectively for different types of communications systems. For example, telephone wiring was used for voice, coaxial cable for data networks, multipair cabling for RS232/RS422 control data, etc. With all of the separate costs involved, this became a very inefficient and costly way to install these systems. A solution was to install a standard cable and connector system throughout a building which could, with some additional equipment, be used to support all or most of the different types of communication systems in use in the building. This standard cable and connector system is called a "Structured Cabling System" ("SCS").

The SCS is a set of cabling and connectivity products that integrates voice, data, video and various building management systems ("BMS"), such as safety alarms, security access, energy systems, etc. Characteristics of an SCS include an open architecture, standardized media and layout, standard connection interfaces, adherence to national and international standards, and total system design and installation. Typically, SCS cable is a multipair cable made up of unshielded twisted pairs ("UTP") of insulated copper conductors. A typical SCS cable includes four such twisted pairs. A typical building has a plurality of SCS cables, perhaps dozens or even hundreds, extending throughout the building. Apart from the SCS, the voice, data, video and BMS have nothing in common, except for similar transmission characteristics (analog or digital data signals) and delivery methods (conduit, cable, tray, raceway, etc.) that support and protect the cabling.

Although it has existed in the SCS in various configurations, CCTV has not been integrated as a complete system into the SCS, since systems equipment has not existed that would provide the means to conveniently interface all of the various types of CCTV cameras, Pan/Tilt/Zoom ("PTZ") systems, monitoring equipment and switching equipment into the SCS. A CCTV system typically has three different types of electrical requirements, viz., control signals which must be sent to each camera and/or PTZ device to control its operation, video data which is sent from each camera to a receiver, and AC power for powering the camera and associated equipment, such as a PTZ unit. The control signals, which are typically in accordance with the RS422 standard, but could also be RS232 or RS485 (bidirectional), have historically been handled over a cabling system distinct from the SCS, and have not been transmitted over UTP cables.

Sending video over UTP cable has been done using the unbalanced-to-balanced line technique (video baluns) for 20 years or more. Baluns are typically passive devices that match impedance and provide common mode rejection. Northern International Technology ("NITEK") has improved on this basic technology by introducing unique, adjustable, active receivers that provide improved common mode rejection and longer distances for transmission of video while maintaining signal integrity and video quality. Previously, transmitting video signals over one twisted pair of SCS cable required the user to provide his own connector and interface equipment. NITEK provides an integrated system for transmitting video signals over one pair of an SCS cable, but the AC power and control signals must still be separately provided. In the security industry, UTP for transmission of video has become increasingly popular over the past five years, as more dealers have been willing to use it in CCTV installations. Problems with earlier systems using technology that was prone to drifting and, in some cases, susceptible to voltage surges, made dealers wary of the technology. Greater acceptance of this technique has come about recently due to lower cost balun devices and the convenience and size advantages of using UTP cable, as opposed to coax cable, for multiple cameras. This has resulted in larger camera projects (hundreds of cameras) using UTP. In response to these larger system requirements, NITEK introduced rack mounted systems that could accept as many as 40 inputs per rack. Such systems are currently primarily targeted for sale through the security system installer/dealer. The systems are typically stand-alone CCTV systems, either connected to existing communication cables or using new UTP cables (mostly CAT 5) installed specifically for the CCTV System.

Some CCTV cameras are provided with local power, i.e., a power supply adapted to be plugged into the 120-volt AC system at the camera location. But many multi-camera video systems power the cameras from a central fused power supply, power from which has, heretofore, been provided independently of the SCS.

SUMMARY

This application discloses a system for handling all the electrical requirements of a video system, which avoids the disadvantages of prior arrangements while affording additional structural and operating advantages.

Applicants have developed a complete CCTV interface system which combines video, control signals (data) and power (hereinafter "Combined Video system"), that is designed to easily integrate into an SCS. The Combined Video system provides the delivery of twisted pair video and RS422 signals for control functions. In addition, the Combined Video system delivers 24 VAC power for all video cameras and PTZ and focus systems, as well as other remote controlled CCTV equipment throughout the SCS. The Combined Video system is designed to operate within SCS standards and coexists within the SCS using cables, connectors and patch panels that are dedicated to the CCTV system. The Combined Video system is not a part of, nor does it connect to, the data network.

The Combined Video system is a unique system that provides a complete solution for integrating CCTV into an SCS. The CCTV system becomes a "self-contained" system within the SCS in that every piece of equipment is powered by the Combined Video system, either from a telecommunication closet (TC) or from the equipment room. In addition, all of the RS422 control signals are distributed to equipment in the CCTV system throughout the SCS, either from a TC or from the equipment room. In this way, the Combined Video system provides the means to connect closed circuit video data, control (RS422) signals, and power to the SCS. Using the SCS, the Combined Video system acts as a distribution interface, providing all of the equipment needed to connect video security cameras and/or PTZ equipment to the security head-end equipment (located in the equipment room). Modular multi-pin plug and jack connectors, such as RJ-45 connectors, are used throughout. The four twisted pairs of each Category 5 SCS cable are dedicated to a given camera: 1 pair for video, 1 pair for RS422 control and 2 pairs for 24 VAC supply voltage (connected in parallel). In this way a single CAT 5 cable provides power to the cameras (and domes) and distributes RS422 control signals to any PTZ domes or other remote control equipment in the system.

An aspect is the provision of a system to interconnect all of the equipment of a video system over copper cabling.

Another aspect is the provision of a system of the type set forth, which is a self-contained system, but can easily be integrated in an SCS.

A still further aspect is the use of a single UTP cable for delivering fused power to a video camera and associated equipment and delivering video signals from the video camera.

A still further aspect is the use of a single UTP cable for delivering control signals to a video camera and associated equipment and delivering video signals from the video camera.

Another aspect is the use of a single UTP cable for delivering fused power and control signals to a video camera and associated equipment using modular multi-pin plug and jack connectors.

Another aspect is the use of a single multi-pair cable for delivering power and control signals to a camera and associated equipment and delivering video signals from the camera.

A still further aspect is the provision of unique equipment for interfacing a multi-camera video systems with an SCS.

Yet another aspect is the provision of a video system which can be incorporated in an SCS utilizing standard connectors.

Certain ones of these and other aspects may be attained by providing a system for operating a video source unit having a video data signal output adapted for coupling to a video receiving unit and a control signal input adapted for coupling to a control unit, the system comprising: a cable, including plural unshielded twisted pairs of conductors, first coupling means at a first end of the cable for coupling a first twisted pair to the video data signal output and a second twisted pair to the control signal input, and second coupling means at a second end of the cable for coupling the first twisted pair to an associated video receiving unit and the second twisted pair to an associated control unit.

Other aspects may be attained by providing a system for operating a video source unit having a video data signal output of the type set forth and a power input adapted for coupling to a fused power source, the first coupling means coupling a selected twisted pair to the power input, and the second coupling means at a second end of the cable for coupling the selected twisted pair to an associated fused power source, each of the first and second coupling means including, for each coupled twisted pair, a modular multi-pin plug and jack connector.

BRIEF DESCRIPTION OF THE DRAWINGS

For the purpose of facilitating an understanding of the subject matter sought to be protected, there are illustrated in the accompanying drawings embodiments thereof, from an inspection of which, when considered in connection with the following description and claims, the subject matter sought to be protected, its construction and operation, and many of its advantages should be readily understood and appreciated.

DETAILED DESCRIPTION

Figure 1:
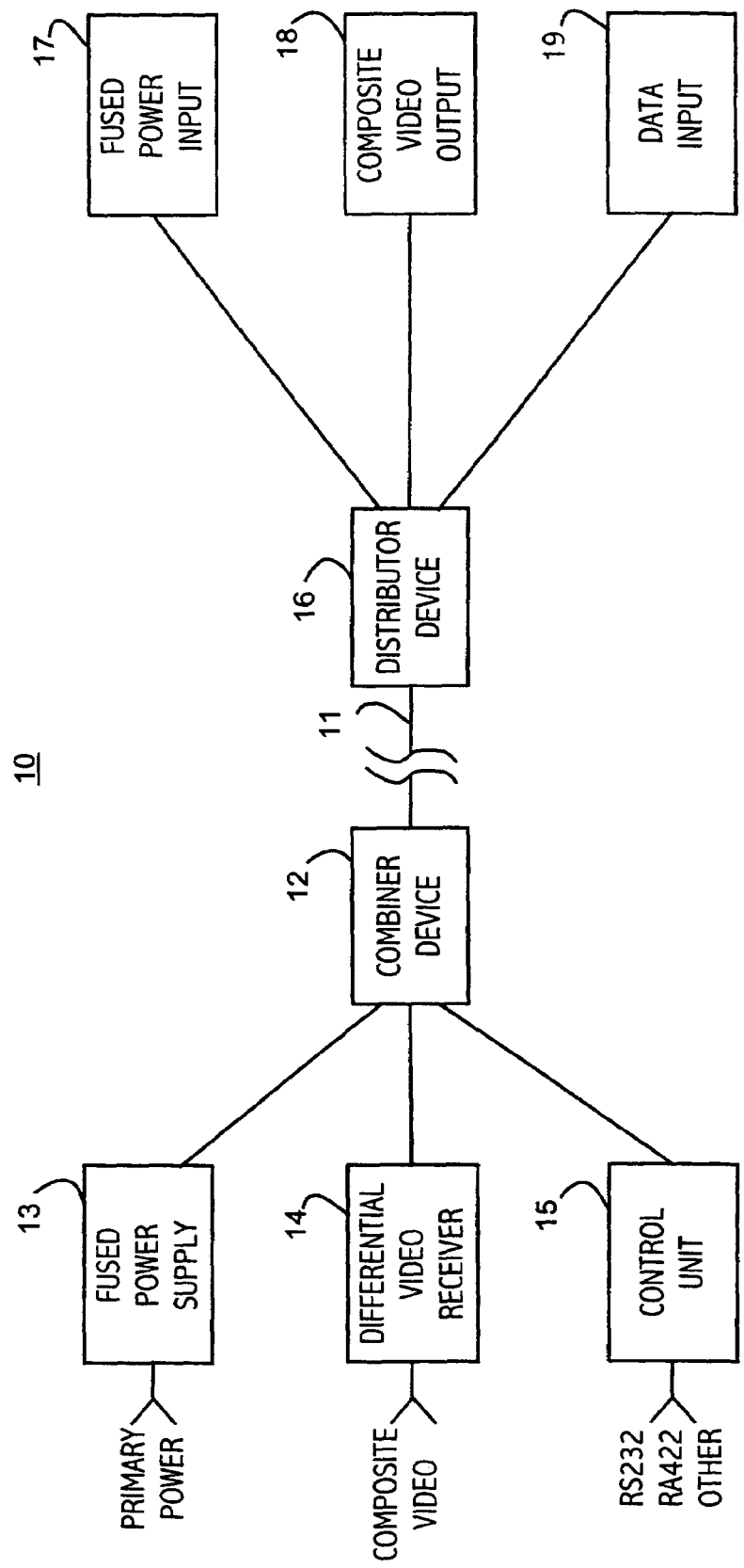
FIG. 1 is a simplified functional, block diagrammatic illustration of a single-camera application of a Combined Video system.

Referring to FIG. 1, there is illustrated a simplified Combined Video system, generally designated by the numeral 10, illustrating the concepts of the system as applied to a single video source unit, such as a video camera. The system utilizes a copper, multipair communication cable 11, which is Category 3 or better, and will typically be an existing 4-pair SCS cable at the site where the system is to be installed. While the cable 11 typically includes four unshielded twisted pairs, all of the pairs may or may not be used, depending upon the particular application. At one end of the cable 11, which may be at a central location, such as a telecommunications closet, the cable 11 is connected, by a single multi-circuit connector, to one end of a combiner device 12, the other end of which may be connected to a suitable fused power supply 13, a differential video receiver 14 and a control unit 15. The power supply 13 will, in turn, be connected to a suitable primary power source, the output of the differential video receiver 14 will be a composite video signal connected to the input of apparatus, such as monitoring or recording equipment, and the input of the control unit 15 will be connected to a source of data signals, which may be in accordance with RS232, RS422 or other suitable standards.

The other end of the cable 11, which may be at a remote location, is connected by a suitable multi-circuit connector to one end of a distributor device 16, the other end of which is connected to a video source unit which includes a fused power input 17, a composite (NTSC or baseband) video output 18 of a video source, such as a CCTV camera, and a data input 19 of a controlled device, such as a PTZ unit, associated with the video source.

Significantly, the system 10 delivers power, control signals and video signals simultaneously over a single SCS multipair cable, and connects to that cable with standard connectors. In this arrangement, the video signal will be transmitted over one twisted pair of the cable 11, the control signals will be transmitted over another twisted pair, and one or two twisted pairs will be used for power, depending upon the power requirements.

While, in the illustrated embodiment, the combiner device 12 is connected to only a single multi-pair cable 11 for connecting a single video source with a single video receiver, it is an aspect of the system, as will be explained more fully below, that the combiner device 12 could be connected to multiple cables 11 for connecting multiple video sources at a plurality of remote sites to plural video receivers at a central location.

Figure 2:
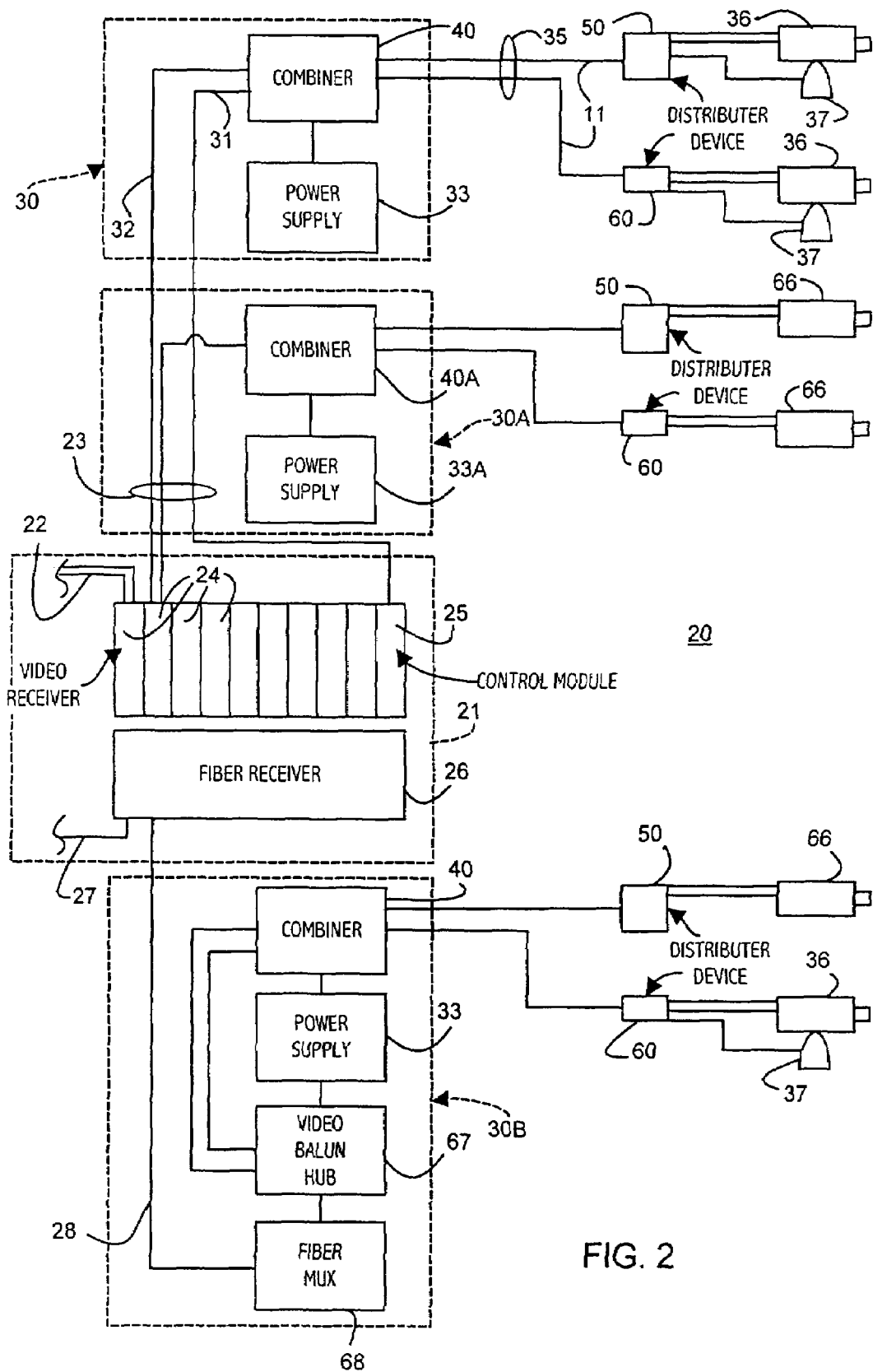
FIG. 2 is a block diagrammatic illustration of incorporation of a Combined Video system including multiple cameras into an SCS of a building.

Referring now to FIG. 2, there is illustrated a typical building installation 20 incorporating specific embodiments of the combined video system 10 in an overall arrangement incorporating multiple video sources and multiple receivers. The video system 10, in all of its various application modes, may incorporate a number of different types of components, some of which are specially designed for the system and some of which have been pre-existing, descriptions of such components being set forth in Appendix 1. While not all of these component variations are incorporated in the installation of FIG. 2, that figure will illustrate the underlying principles.

The building installation 20 will typically include a central equipment room 21, which may be connected, as via cabling 22, to the copper campus backbone, if the building is one of a number of buildings in a campus arrangement, and is also connected, as by a copper riser backbone cabling 23, to one or more telecommunications closets 30, 30A, 30B etc. These telecommunications closets may be located on different floors of a multi-story building, or a single floor of a building may have multiple telecommunications closets, depending upon the size of the floor. Disposed in the equipment room 21 may be one or more video receivers 24, which may be in the nature of receiver module cards, two types of which, respectively designated VM562 and VM564, are described in Appendix 1, and a plurality of which may be mounted in a single multi-module powered rack of the type designated RK500 and described in Appendix 1. The equipment room 21 could house receivers simply for the building in which it is located, or could house receivers associated with video sources in other buildings of a campus arrangement. Also disposed in the equipment room 21 is a control module 25, which may also be in the form of a rack-mounted module card, of the type designated DM424 and described in Appendix 1. In the event the facility is provided with a fiber network, the equipment room 21 may also include a fiber receiver 26, which may be coupled by cabling 27, to a fiber campus backbone, and also to a fiber riser backbone 28 of the local building, which backbone may, in turn, may be connected to one or more telecommunication closets.

Disposed in each of the telecommunications closets is a combiner device (see 12 in FIG. 1), two general types of which, 40 and 40A, are shown in FIG. 2 and described in Appendix 1. Thus, the telecommunications closet 30 is shown as housing a combiner 40 (designated CX522 in Appendix 1). The combiner 40 is connected by a control cable 31 to the control module 25, and is also connected by video cables 32 to one or more of the video receivers 24, only one such connection being illustrated in FIG. 2. The cables 31 and 32 may terminate at a patch panel or the like in the telecommunications closet 30. Also connected to the combiner 40 is a power supply 33, which may be of the type designated PS510 in Appendix 1, which is a 10-amp supply providing 24 VAC power for up to eight video sources and associated PTZ units. The combiner 40 is also connected, via horizontal cabling 35, to one or more of the video sources described in connection with FIG. 1, two such sources being illustrated in FIG. 2, each being in the nature of a moveable camera 36 and associated PTZ unit 37. The illustrated horizontal cabling 35 includes two cables, each of which is a multi-pair cable, which may be a 4-pair SCS cable 11, each of which is connected to its associated video source through a suitable interface corresponding to the distributor device 16 of FIG. 1. Two different types of such distributor devices, respectively designated WM101 and CM103, are described in Appendix 1 and are, respectively, designated 50 and 60 in FIG. 2.

Figure 3:
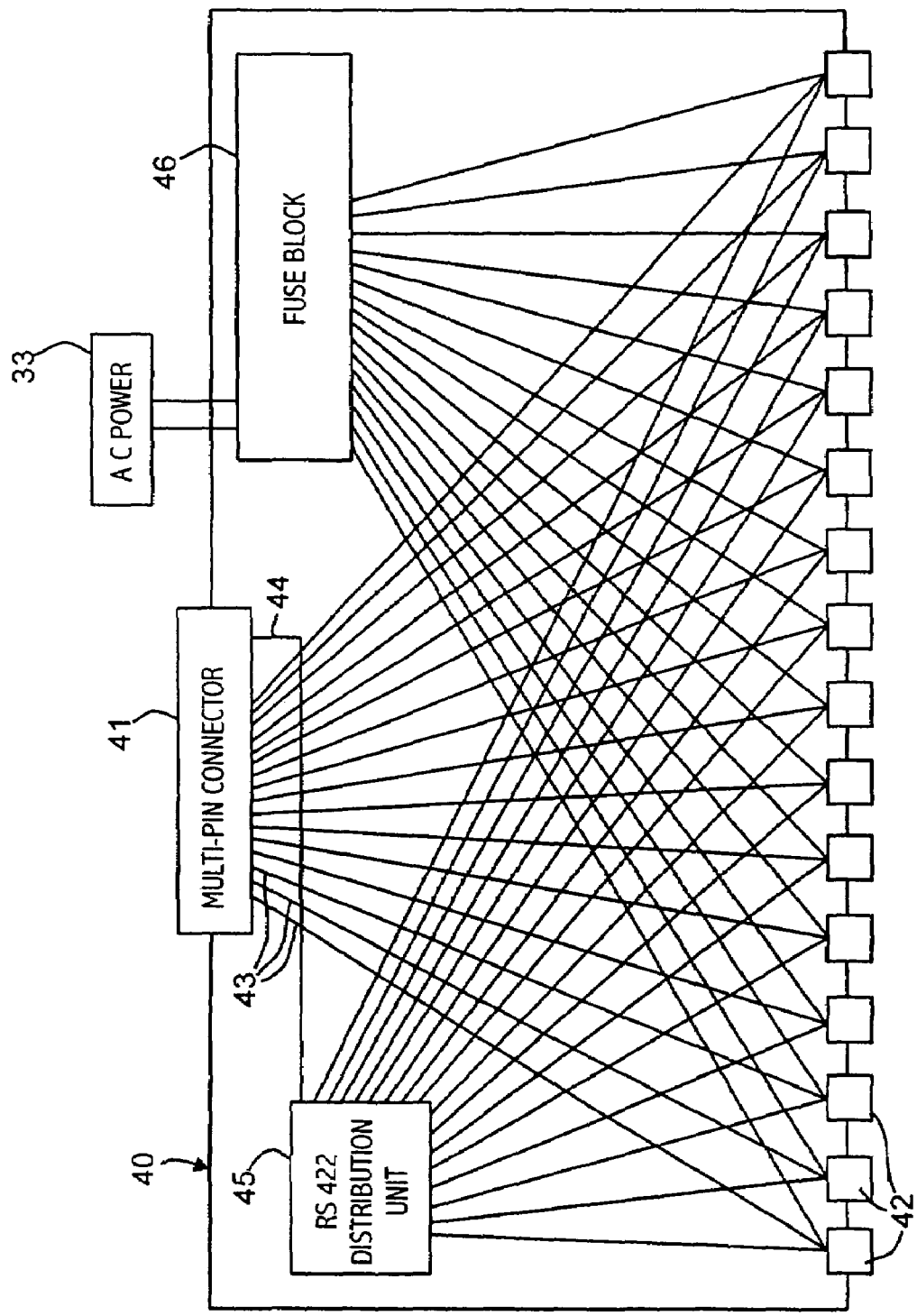
FIG. 3 is a block diagrammatic illustration of a combiner device of the systems of FIGS. 1 and 2.

Referring now also to FIG. 3, the combiner 40 includes a multi-pin connector 41, such as a 50-pin Telco connector, which is adapted to be connected to the copper riser backbone 23. The pins of the connector are arranged in pairs, respectively connected to output jacks 42 by video lines 43. Each of the jacks 42 may be a standard RJ-45 jack adapted for connecting to a standard 4-pair cable. One pair of pins of the connector 41 is reserved for control signals and is connected by a line 44 to a control signal (RS422) distribution unit 45, which is in turn connected to each of the jacks 42. AC input power from the power supply 33 is applied to a fuse block 46, which includes multiple fuses respectively connected in parallel to the output jacks 42. Thus, it can be seen, that each of the jacks 42 has one pair of its terminals connected by a video line 43 to the connector 41, one pair connected to the control signal distribution unit 45, and at least one pair connected to AC power through a fuse of the fuse block 46. Each jack 42 may have two of its terminal pairs connected to the fuse block 46, depending upon the power needs. It will be appreciated that FIG. 3 is functional diagram and the combiner 40 may be embodied in a PC board.

It will be appreciated that the control module 25 is connected through the connector 41 to the data line 44, one or more video receivers 24 are connected through the connector 41, respectively to video lines 43, and AC power is connected to all of the fuses of the block 46. Each of the jacks 42 is connectable to a multi-pair cable 11 (see FIG. 1), which may be a 4-pair SCS cable, the other end of which is connected to a distributor device. The connector 41 may be connected by suitable jumper cable to the patch panel at which the cables 31 and 32 are terminated. Also, it will be appreciated that the horizontal cabling 35 on the building floor will, in accordance with applicable telecommunications cabling standards, typically be terminated at suitable jacks. Thus, a short jumper cable, terminated with compatible plugs, may be utilized to connect each of the jacks 42 of the combiner 40 with the associated multi-pair cable 11.

Figure 4:
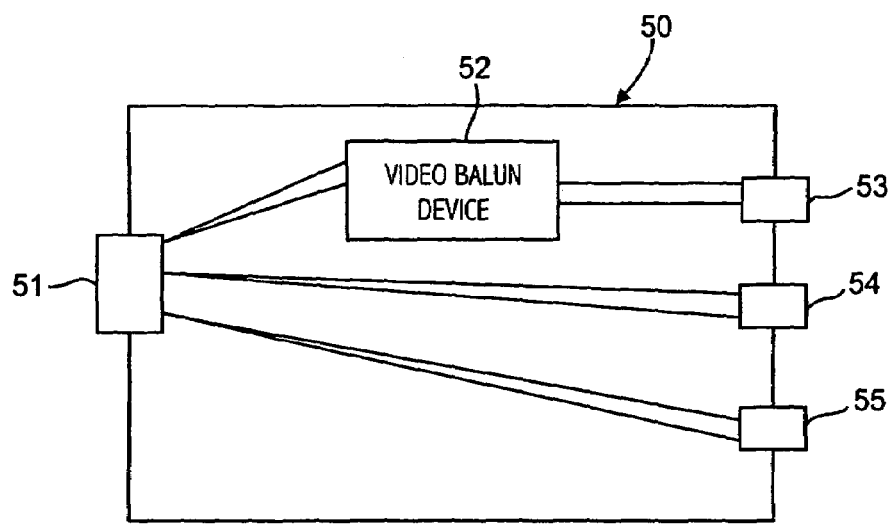
FIG. 4 is a block diagrammatic illustration of one type of distributor unit used in the system of FIG. 2.

Referring also to FIG. 4, a distributor device, in the nature of a camera interface 50 (of the type designated WM 101 in Appendix 1), is illustrated. The distributor unit or camera interface 50 has a jack connector 51 at one end thereof, which may be a standard RJ-45 connector, and is connected to the remote end of a multi-pair cable 11 (FIG. 1). It will be appreciated that there will be one distributor unit or camera interface for each of the jacks 42 of the combiner 40 which is being used in the system. One pair of terminals of the jack 51 is connected to a video balun device 52, which is in turn connected to a composite video jack 53, which may be a standard coaxial BNC connector, adapted to receive a plug from the associated camera 36 (FIG. 1). A second pair of terminals of the jack 51 are connected to a control (RS422) jack 54, which may be in turn connected to the PTZ device 37 for the video camera. The final two pairs of terminals of the jack 51 are connected to a power jack 55, which is connected to the PTZ device 37, which is in turn connected to the camera 36. The camera interface 50 is a wall-mountable unit adapted to be mounted at the location of the camera 36. It will be appreciated that the camera interface 50 may be embodied in a printed circuit board. Also, it will be understood that a suitable plug-terminated jumper cable may be utilized to connect the jack 51 to a wall jack in which the associated multi-pair cable 11 is terminated.

Figure 5:
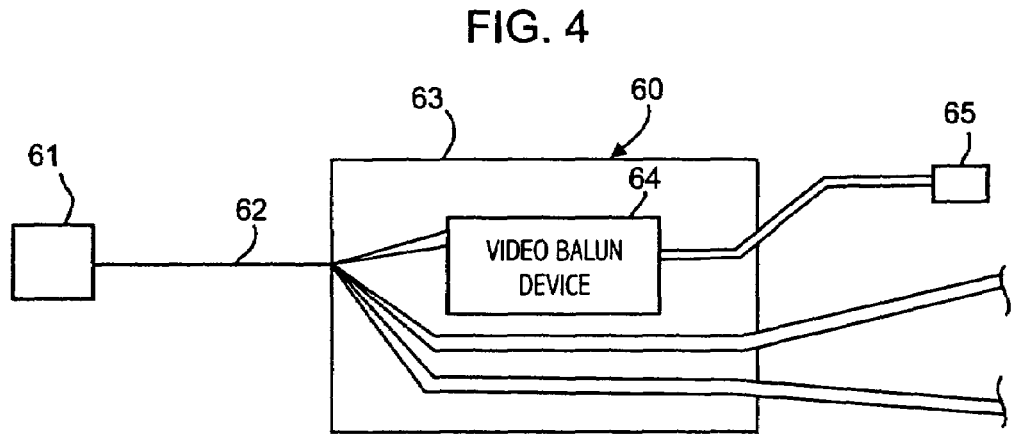
FIG. 5 is a block diagrammatic illustration of another type of distributor unit in the system of FIG. 2.

Referring to FIG. 5., there is illustrated an alternative form of camera interface 60 (of the type designated CM 103 in Appendix 1), which may be embodied in a cable. The interface 60 includes a plug connector 61, which may be an RJ-45 connector and is adapted to plug into a counterpart jack, which could be a wall-mounted jack terminating one of the multi-pair SCS cables 11 of the building horizontal cabling 35. The jack 61 is, in turn, connected to a single multi-pair cable 62, which may be an SCS 4-pair cable, which has built therein a PCB 63 in which one twisted pair of the cable 62 is connected to a video balun device 64, which is in turn connected to a composite video jack 65. The remaining twisted pairs of the cable 62 are "passed through" the PCB 63 for connecting directly to control input terminals of a PTZ unit 37, and power input terminals of the associated camera 36 and/or PTZ unit 37, as at screw terminals.

The telecommunications closet 30A is similar to the closet 30, except that it includes a combiner device 40A, which is of the type designated CX 516 in Appendix 1, and is essentially the same as the combiner 40 illustrated in FIG. 3, except that it does not include the control signal distribution unit 45. Thus, this type of combiner combines only video and power and is adapted for handling video sources, such as fixed cameras 66, which do not have an associated PTZ unit and, therefore, do not require the associated control signals. In this case, the power to the combiner 40A is provided by a power supply 33A, which may be of the type designated PS 505 in Appendix 1, providing a 5-amp, 24 VAC supply for up to 16 fixed cameras.

The telecommunications closet 30B is similar to the closet 30, described above, except that in this case the combiner 40 is connected, via video and control signal lines, to a video balun hub 67, such as that designated VH160 in Appendix 1 which is, in turn, connected through a fiber multiplexer 68 to the fiber riser backbone 28.

Because the video system 10 is completely separate from any data network in the associated building, it is unconstrained by the typical "100 meter rule" applied to horizontal runs of computer cabling in SCS installations.

Figure 6:
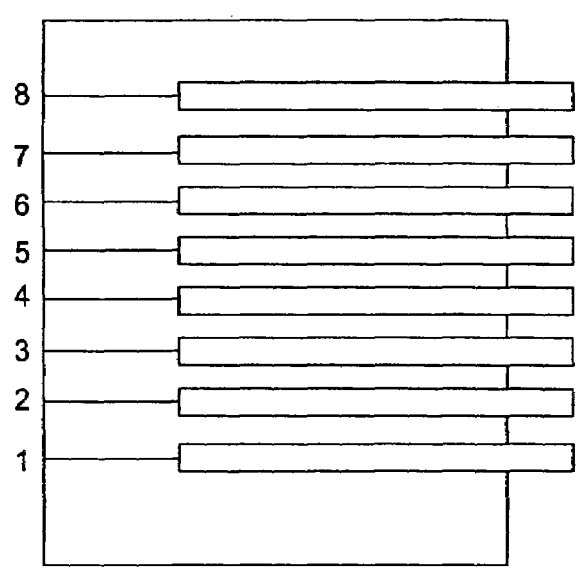
FIG. 6 is a diagrammatic illustration of the pin arrangement in a standard RJ-45 connector.

In connecting the circuitry to the standard RJ-45 connectors, the system 10 and the building installation 20 utilize a unique pin assignment arrangement. FIG. 6 illustrates the pin designations for a standard RJ-45 connector. As can be seen, the connector includes eight pins, respectively designated 1 through 8. Certain connectors of the system 10 and the building installation 20, such as the wall plate-type distributor devices WM101, may be difficult to distinguish from a standard wall plate for a common computer jack. Also, the systems disclosed herein may commonly be used in association with network arrangements, such as Ethernet, in a building SCS and, therefore, it is possible that Ethernet devices might accidentally be plugged into a jack of the Combined Video system. Certain pin assignment arrangements of the RJ-45 connectors could result in damage to certain Ethernet devices which were accidentally plugged into the Combined Video system. Accordingly, applicants have devised a unique pin assignment for their connectors. Ethernet networks typically use a common pin assignment arrangement, designated "T-568B." This arrangement is set forth in Table I. In this arrangement, two of the pairs of terminals in the connector are typically unused, but could be used for a second Ethernet line or for other purposes. Also set forth in Table I is applicants' pin assignments for the same type of connector. It has been found that these pin assignments will not harm Ethernet devices which are connected thereto.

TABLE I

| Pin | T568B Assignment | Applicants' Assignment |
|---|---|---|
| 1 | TxData+ | Video+ |
| 2 | TxData− | Video− |
| 3 | RecvData+ | 24 VAC Common |
| 4 |  | RS422− |
| 5 |  | RS422+ |
| 6 | RecvData− | 24VAC Live |
| 7 |  | 24VAC Common |
| 8 |  | 24VAC Live |

In the illustrated embodiments, the combiners and distributor devices utilize standard RJ-45 connectors for convenience in connecting and disconnecting the Combined Video system to a building SCS. However, it will be appreciated that other types of connectors could be utilized. For example, insulation displacement connectors, such as the type commonly referred to as "punch down blocks," could be utilized. While this would not offer the same convenience and ease of installation as the use of plug-and-socket connectors, it may be desirable in connection with certain cabling codes or standards.

While the disclosed embodiments are in the context of a CCTV system, it will be appreciated that the principles of the system would also be applicable to "IP" or digital, computer-based cameras, in which digital data is communicated to and from the camera. In such an application, one pair of a multi-pair cable would be used for data in one direction and another pair for data in the opposite direction. Also, while the distributor device 16 has been disclosed as a separate interface device 50 or 60, it will be appreciated that it would also be possible to build it into the associated video source.

While particular embodiments have been shown and described, it will be apparent to those skilled in the art that changes and modifications may be made without departing from the principles of the Combined Video system in its broader aspects. The matter set forth in the foregoing description and accompanying drawings is offered by way of illustration only and not as a limitation.

APPENDIX I

Combined Video System Components

Eleven basic components (building blocks) can be used to complete a Combined Video system. All eleven components will not be used in smaller systems, but it is possible to use all of the basic components in a larger system. The components are listed by their location in the SCS system:

Equipment Room—Head End Equipment. The Combined Video head-end equipment consists of a multi-channel rack mounted receiver system for receiving video over a copper riser backbone, from within a facility or a copper campus backbone, from other facilities.

RK500 Powered Rack—accepts up to 10 in any combination of VM564, VM562, DM424.

VM564 Quad Active Receiver Module Card—Inserts into the RK500 card cage—Receives video from WM101 or CM103. Operates up to 3,000 feet over Category 3 or better cable. With 8 cards, provides up to 32 video inputs.

VM562 Dual Active Receiver Module Card—Inserts into the RK500 card cage—Receives video from WM101 or CM103. Operates up to 3,000 feet over Category 3 or better cable. With 8 cards, provides up to 16 video inputs.

DM424 Data Module Card—Distributes RS422 to up to 16 Pan/Tilt/Zoom units. RK500 will accept 2 DM424 cards for a total of 32 Pan/Tilt/Zoom units.

Telecommunication Closet (TC) Equipment

CX522 Crossover Interface-with RS422 Capability
Provides means to connect horizontal runs to the copper backbone directly or to a VH160 video hub which provides an interface to a fiber transmitter for connection to a fiber backbone.
RJ-45 connectors (one for each camera) connect to the WM101 or CM103 to deliver video to the copper backbone or VH160, RS422 to the PTZ receiver/driver and power to the camera, receiver/driver and PTZ unit.

CX516 Crossover Interface—Same as CX522, except does not provide RS422 distribution.

VH160 Video Balun Hub
Passive 16 port unit, receives video from WM101 or CM103; base band video output interfaces with fiber transmission equipment for connection to a fiber riser backbone.

PS505 Power Supply—5 Amp; provides 24VAC power for 16 cameras; connects to the CX516 for distribution of power by means of RJ-45 connectors.

PS510 Power Supply—10 Amp; provides 24VAC power for 4 cameras and P/T/Z units; connects to the CX522 for distribution of power by means of RJ-45 connectors.

Camera Interface Equipment

WM101 Camera Interface—Wall Module; connects to the CX516 or CX522; contains a video balun transceiver that transmits to the VH160, VM164 or VM162; connects power to the camera, receiver/driver and P/T/Z unit and RS422 to the receiver/driver via RJ-45 connector.

CM103 Camera Interface—In-Line Cable Module; features same as VM101, except does not connect via RJ-45 connector.

What is claimed is:

1. A CCTV system for interfacing with a structured cabling system (SCS) of a building, which comprises:
    a plurality of video cameras, each having an analog video signal output;
    a control device for movement of each of said video cameras;
    a control unit for providing signals for each control device whereby movement of one or more of the video cameras is determined;
    each of said video cameras having a power input;
    a power supply for providing power to each power input;
    a multipair cable for each of said video cameras;
    a combiner with connectors for coupling the multipair cables; said connectors compatible with a structured cabling system of the building;
    for each of said multipair cables, a first twisted pair coupled from said combiner to the analog video signal of said video camera;
    said combiner for coupling said analog video signals from the first twisted pairs of said multipair cables to said video receivers;
    for each of said multipair cables, a second twisted pair coupled from said combiner to said control device;
    said combiner enabling said control unit data to be coupled via said multipair cable to said control devices;
    for each of said multipair cables, a third twisted pair coupled from said combiner to said power input;
    said combiner for coupling a plurality of said third twisted pairs from said multipair cables to said power supply.

2. A CCTV system for interfacing with a structured cabling system of a building, as defined by claim 1, in which said power supply includes AC power from an external power supply located outside of said combiner.

3. A CCTV system for interfacing with a structured cabling system (SCS) of a building, which comprises:
    a plurality of video cameras, each having an analog video signal output;
    each of said video cameras having a power input;
    a AC power supply for providing power to each power input;
    a multipair cable for each of said video cameras;
    a combiner with connectors for coupling the multipair cables; said connectors compatible with a structured cabling system of the building;
    for each of said multipair cables, a first twisted pair coupled from said combiner to the analog video signal of said video camera;
    for each of said multipair cables, a second twisted pair coupled from said combiner to said power input; and
    said combiner for coupling a plurality of said second twisted pairs from said multipair cables to said AC power supply.

4. A CCTV system for interfacing with a structured cabling system of a building as defined by claim 3, in which said AC power supply is located outside of said combiner.

5. A CCTV system for interfacing with a structured cabling system (SCS) of a building, which comprises:
    a video camera, having an analog video signal output;
    said video camera having a power input;
    an AC power supply for providing power to said power input;
    a multipair cable for said video camera, said multipair cable having a first end and a second end;
    a distributor with a connector for coupling to the multipair cable, located at the first end of the multipair cable;
    said connector compatible with a structured cabling system of the building;
    said analog video signal from said video camera coupled to said distributor;
    said distributor coupling said analog video signal to a first wire pair of said multipair cable via said connector;
    said distributor coupling said power input of said video camera to a second wire pair of said multipair cable via said connector;
    said second pair of the multipair cable coupled to said AC power supply located at the second end of the multipair cable.

6. A CCTV system for interfacing with a structured cabling system of a building, as defined by claim 5, in which said first pair of multipair wire coupled to a video receiver located at the second end of the multipair cable.

7. A CCTV system for interfacing with a structured cabling system (SCS) of a building, which comprises:
    a video camera, having an analog video signal output;
    a control device for movement of said video camera;
    said video camera having a power input;
    a power supply for providing power to said power input;
    a multipair cable for said video camera, said multipair cable having a first end and a second end;

a distributor with a connector for coupling to the multipair cable, located at the first end of the multipair cable;

said connector compatible with a structured cabling system of the building;

said analog video signal from said video camera coupled to said distributor;

said distributor coupling said analog video signal to a first wire pair of said multipair cable via said connector;

said distributor coupling said control device to a second wire pair of said multipair cable via said connector;

said distributor coupling said power input of said video camera to a third wire pair of said multipair cable via said connector.

8. A CCTV system for interfacing with a structured cabling system of a building, as defined by claim 7, in which said first pair of multipair wire coupled to a video receiver located at the second end of the multipair cable;

said second pair of the multipair cable coupled to said control unit for providing signals for said control device, whereby movement of the video camera is determined;

said control unit located at the second end of the multipair cable;

said third pair of multipair cable coupled to said power supply located at the second end of the multipair cable.

9. A CCTV system for interfacing with a structured cabling system (SCS) of a building, which comprises:

a video camera, having an analog video signal output;

a control device for movement of said video camera;

a multipair cable for said video camera, said multipair cable having a first end and a second end;

a distributor with a connector for coupling to the multipair cable, located at the first end of the multipair cable;

said connector compatible with a structured cabling system of the building;

said analog video signal from said video camera coupled to said distributor;

said distributor coupling said analog video signal to a first wire pair of said multipair cable via said connector;

said distributor coupling said control device to a second wire pair of said multipair cable via said connector.

10. A CCTV system for interfacing with a structured cabling system (SCS) of a building, which system is adapted for handling a plurality of video signals from video cameras and is adapted for handling sufficient power for operating the plurality of video cameras, said system comprising:

a combiner;

said combiner having an input for accepting control data signals from a control unit;

said combiner having a power supply input;

said combiner having outputs for connection to video receivers;

said combiner having a plurality of connectors compatible with a structured cabling system of the building;

said plurality of connectors of said combiner each having multiple pins;

said combiner coupling said power supply input to a first pair of pins of said connectors;

said combiner coupling said control data input signal to a second pair of pins of said connectors; and said combiner coupling a third pair of pins from each of said connectors to said outputs for connection to said video receivers.

11. A CCTV system for interfacing with a structured cabling system (SCS) of a building, which comprises:

a distributor;

said distributor having an input for a video signal;

said distributor having an output for a control data signals for controlling a control device;

said distributor having a power output for connection to a video camera;

said distributor having a distributor connection compatible with a structured cabling system of the building;

said distributor connector of said distributor having multiple pins;

said distributor coupling a first pair of pins of said distributor connector to said distributor power output;

said distributor coupling a second pair of pins of said distributor connector to a control data signal output; and said distributor coupling a third pair of pins of said distributor connector to said video signal input.

12. A CCTV system for interfacing with a structured cabling system (SCS) of a building, which system is adapted for handling a plurality of video signals from video cameras and is adapted for handling sufficient power for operating a plurality of video cameras, said system comprising:

a distributor;

said distributor having an input for a video signal;

said distributor having an output for control data signals for controlling a control device;

said distributor having a power output for connection to a video camera;

said distributor having a distributor connector compatible with a structured cabling system of the building;

said distributor connector of said distributor having multiple pins;

said distributor coupling a first pair of pins of said distributor connector to said distributor power output;

said distributor coupling a second pair of pins of said distributor connector to a control data signal output;

said distributor coupling a third pair of pins of said distributor connector to said video signal input;

a combiner;

said combiner having an input for accepting control data signals from a control unit;

said combiner having a power supply input;

said combiner having outputs for connection to video receivers;

said combiner having a plurality of connectors compatible with a structured cabling system of the building;

said plurality of connectors of said combiner each having multiple pins;

said combiner coupling said power supply input to a first pair of pins of said connectors;

said combiner coupling said control data input signal to a second pair of pins of said connectors; and said combiner coupling a third pair of pins from each of said connectors to said outputs for connection to said video receivers.

13. A CCTV system for interfacing with a structured cabling system (SCS) of a building which system is adapted for handling a plurality of video signals from video cameras and is adapted for handling sufficient power for operating a plurality of video cameras, said system comprising:

a plurality of distributors;

each distributor having an input for a video signal;

each distributor having an AC power output for connection to a video camera;

each distributor having a distributor connector compatible with a structured cabling system of the building;

said distributor connector of each distributor having multiple pins;

each distributor coupling a first pair of pins of said distributor connector to said distributor power output;

each distributor coupling a second pair of pins of said distributor connector to said video signal input;

a combiner;

said combiner having an AC power supply;

said combiner having outputs for connection to video receivers;

said combiner having a plurality of connectors compatible with a structured cabling system of the building;

said plurality of connectors of said combiner each having multiple pins;

said combiner coupling said AC power supply to a first pair of pins of said connectors; and said combiner coupling a second pair of pins from each of said connectors to said outputs for connection to said video receivers.

14. A CCTV system for interfacing with a structured cabling system of a building, as defined by claim 13, in which said AC power supply is located outside of said combiner.

* * * * *